F. J. C. TESSE.
ROTARY CYLINDER MOTOR.
APPLICATION FILED OCT. 17, 1914.

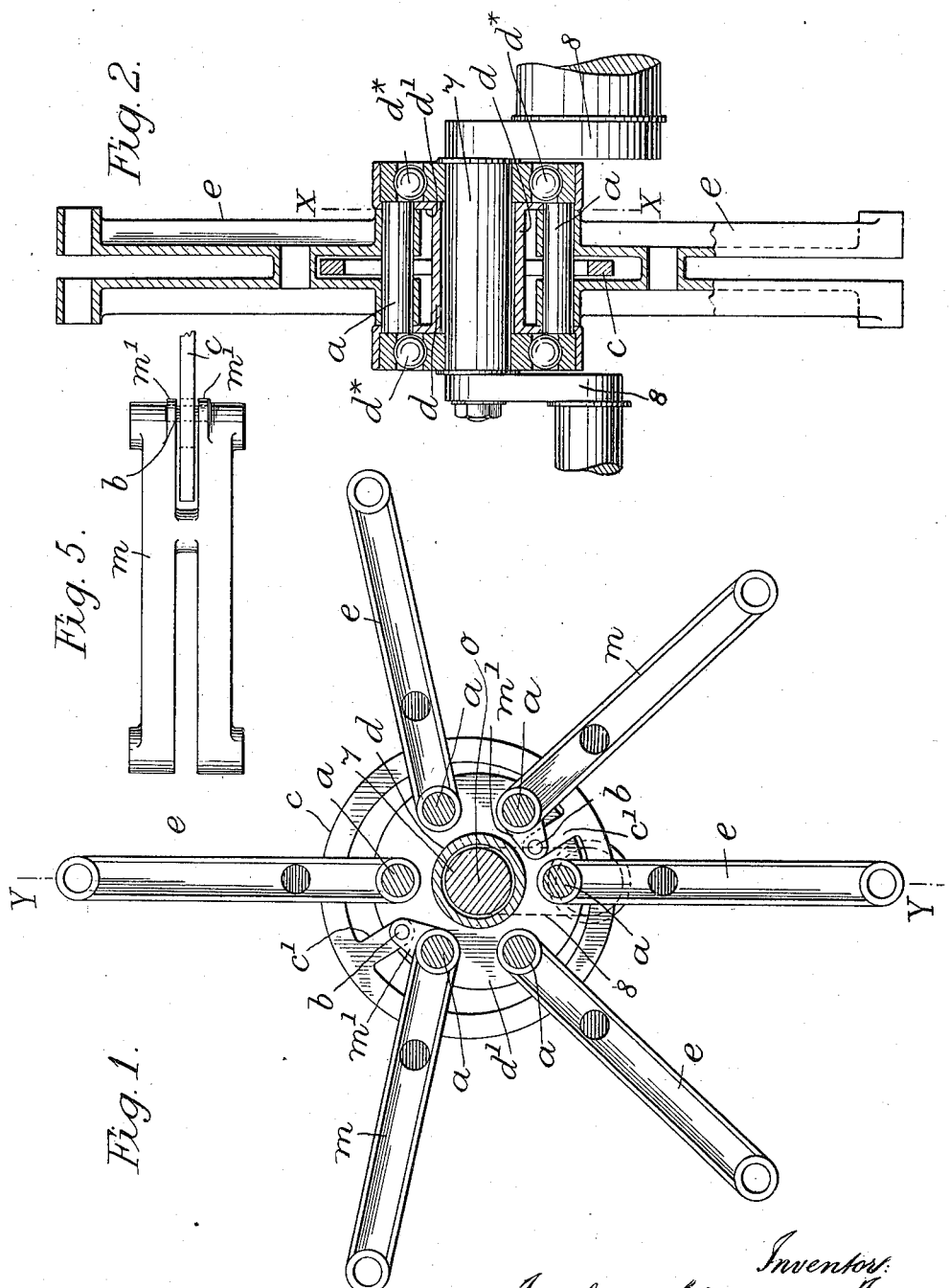

Patented Mar. 27, 1917.

Inventor:
Felix Joseph Charlemagne Jesse
By Attorneys,
Fraser, Tink & Myers

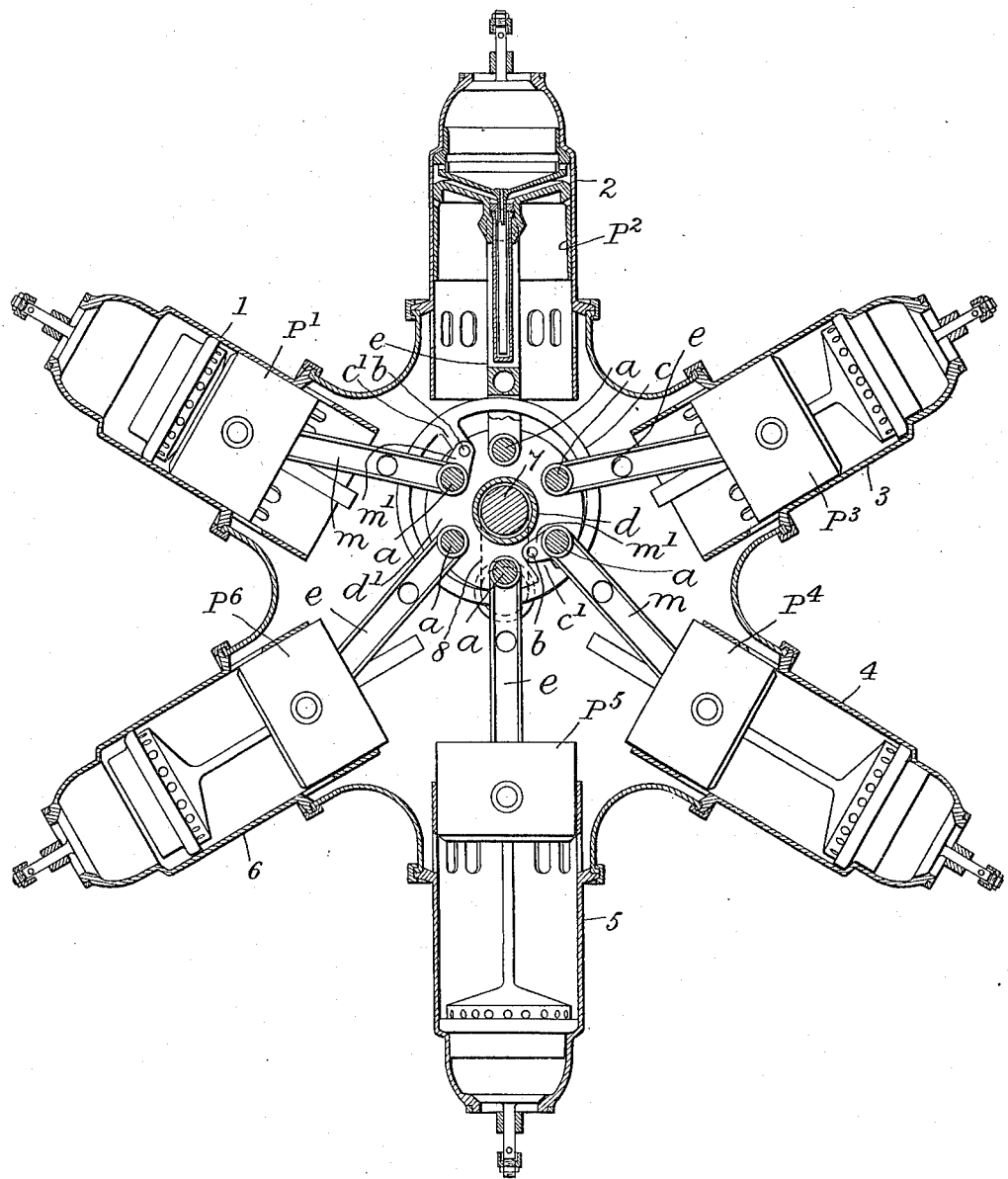

UNITED STATES PATENT OFFICE.

FELIX JOSEPH CHARLEMAGNE TESSE, OF LA VARENNE ST. HILAIRE, FRANCE, ASSIGNOR OF ONE-HALF TO GEORGE MOLLISON, OF EASTBOURNE, ENGLAND.

ROTARY-CYLINDER MOTOR.

1,220,706.

Specification of Letters Patent.

Patented Mar. 27, 1917.

Application filed October 17, 1914. Serial No. 867,084.

*To all whom it may concern:*

Be it known that I, FELIX JOSEPH CHARLEMAGNE TESSE, a citizen of the Republic of France, residing at 12 Chemin Lateral Nord, La Varenne St. Hilaire, Seine, France, have invented certain new and useful Improvements Relating to Rotary-Cylinder Motors, of which the following is a specification.

This invention relates to an arrangement for coupling the connecting rods to the crank in radial rotary cylinder motors comprising an even number of connecting rods mounted on one crank.

In radial rotary cylinder motors the coupling of the connecting rods of the pistons is usually defective, because only the foot of the master or primary connecting rod describes a circle and the feet of the other or secondary connecting rods being pivoted or jointed on journals or trunnions in rigid connection with the first, describe dissimilar curves and with a non-uniform movement.

The object of the present invention is to provide an improved arrangement whereby this may be obviated.

According to the present invention an even number of opposite or principal master connecting rods (two at least) are mechanically connected together by means of one or more members to which they are jointed by journals or trunnions.

The invention comprises in a radial rotary cylinder motor having an even number of radial cylinders rotatably mounted about a crank shaft, a hub member revolubly mounted on the crank pin of the crank shaft, a pair of principal connecting rods appertaining to the pistons of two opposite cylinders and connected to the said revoluble hub member, secondary connecting rods appertaining to the pistons of others of the said cylinders and connected to the said hub member, and a connecting member to which said opposite principal connecting rods are pivotally connected and whereby they are connected mechanically together.

One form of the new arrangement is illustrated by way of example in the accompanying drawings which illustrate an arrangement for a six cylinder motor.

Figure 1 is a section of the connecting rod system on line X—X, Fig. 2;

Fig. 2 is a section on line Y—Y, Fig. 1;

Fig. 5 is a separate detail view of one of the principal connecting rods showing its connection to the ring member $e$.

Fig. 6 is a section view of the rotary cylinder engine with the invention applied thereto.

The drawings show the invention as applied to a two cycle motor of the character described in the specification of my application for Patent S. No. 19844 dated 7th April 1915.

1, 2, 3, 4, 5, 6 indicate the six cylinders of the motor. $P^1$ $P^2$ $P^3$ $P^4$ $P^5$ $P^6$ are the power pistons thereof respectively. $d$ is a hub member revolubly mounted through the medium of ball bearings on the crank pin 7 of the crank 8 about which the cylinders rotate.

The pistons $P^1$ $P^4$ of two opposite cylinders 1 and 4 are connected to the hub member $d$ by principal or master connecting rods $m\ m'\ m\ m'$, and the pistons $P^2$ $P^3$ $P^5$ $P^6$ of the other cylinders are connected to the hub member $d$ by the secondary connecting rods $e\ e\ e\ e$. The principal connecting rods $m\ m'$, $m\ m'$ and the secondary connecting rods $e$, pivotally connected to their respective pistons are analogously pivoted at their other ends on pins $a\ a\ a\ a\ a\ a$ which are mounted in and lie between the inside faces or flanges $d'$ of the hub member $d$.

The two principal connecting rods are formed as bell crank levers of which $m'\ m'$ represent the short arms.

The connecting rods $m\ m'$ and $e$ are forked to provide the necessary clearance for an independent ring or member $c$ extending freely around the hub member $d$, the limbs of the forked ends passing on each side of the ring or connecting member $c$. The two principal connecting rods are mechanically connected together by the ring or member $c$, for which purpose their short arms $m'$ are pivotally attached to this member by pins or trunnions $b$, $b$ passed through their forked short arms $m'$ and through inwardly projecting arms $c'\ c'$ of the ring member $c$ but not into the faces or flanges $d'$ of the hub member $d$. The forked ends of the connecting rods $m\ m'$ and $e$ provide the necessary circumferential clearance for the member $c$.

The distances from the center $o$ of the crank pin to the centers of the pivots $a\ a\ a\ a\ a\ a$ of the feet of the principal or secondary connecing rods, which are uniform in the example, may be different.

The distance between the centers of the pivots $b\ b$ carried by the member $c$ is such that when the connecting rod system is thus mounted together with the cylinders, the straight line, $a\ o\ a$ joining the centers of the feet of the principal rods to the center $o$ rotates about the point $o$ with an angular velocity approximately equal to that of the cylinders relatively to their own center of rotation.

Figure 3:
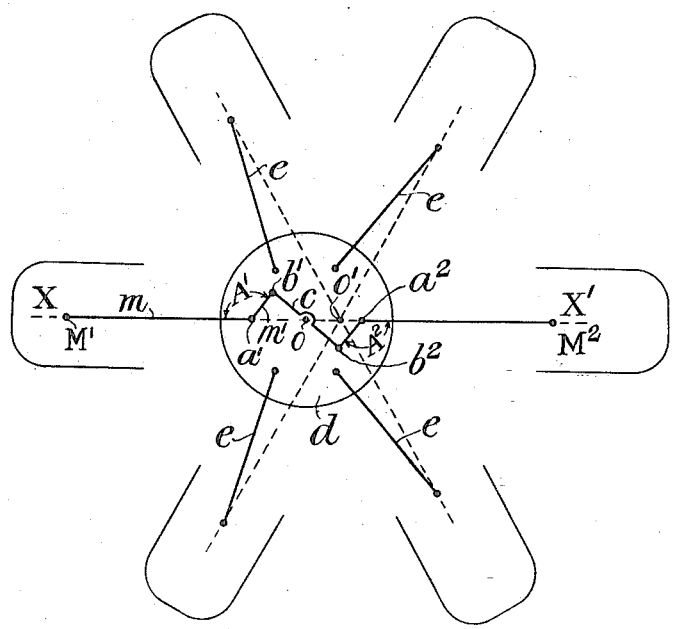
Figs. 3 and 4 are diagrams illustrating the motion of the system.
Figure 4:
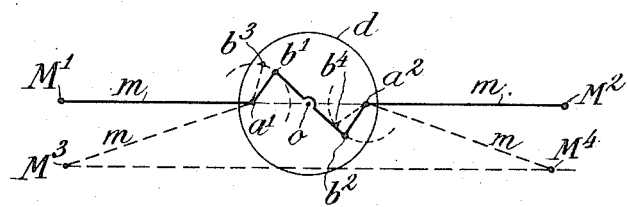

Referring to Figs. 3 and 4, let $o$ be the center of the crank pin; $o'$ the center of rotation of the group composed of the casing and cylinders, $d$ the central piece or hub member mounted on the crank pin; $a^1\ a^2$ the pivot centers of the principal connecting rods $m\ m'$ on the central piece $d$; $b^1\ b^2$ the centers of the pivots by which the angular ends of the principal connecting rods are jointed to the lever or member $c$; $c$ the lever or member connecting pivots $b^1\ b^2$, and which in Figs. 1 and 2 has the form of a ring.

$M^1\ M^2$ the ends of the connecting rods remote from the crank pin; $e$ (Fig. 3) represent the secondary connecting rods as before.

The two centers $a'$ and $a^2$ in Fig. 3 are situated on the axial line $X\ X^1$ of the opposite cylinders of the two master connecting rods.

The length $b^1\ b^2$ is that of the tangent common to the two arcs of radius $a^1\ b^1$ (the same as radius $a^2\ b^2$) struck from $a'$ and $a^2$ as centers (Fig. 4).

The angles $A^1$ and $A^2$ are equal angles formed by $M^1\ a^1\ M^2\ a^2$ with the perpendiculars $a^1\ b^1$, $a^2\ b^2$ to the tangent $b^1\ b^2$.

Referring now to Fig. 4, suppose for a moment the hub member $d$ to be fixed, and apply pressure to the left hand connecting rod so as to move $M^1$ to $M^3$. This connecting rod ($M^1\ a^1\ b^1$) pivots about $a^1$ and takes the position $M^3\ a^1\ b^3$. The connecting lever $b^1\ b^2$ will come to $b^3\ b^4$ and the right hand principal connecting rod ($M^2\ a^2\ b^2$) pivoting about $a^2$, will come to position ($M^4\ a^2\ b^4$). Now the angles $b^3\ a^1\ b^1$ and $b^4\ a^2\ b^2$ are sensibly equal for small displacements of $M^1$. The consequence is that that the angles $M^1\ a^1\ M^3$ and $M^2\ a^2\ M^4$ are sensibly equal, and also the angles $M^3\ a^1\ a^2$ and $M^4\ a^2\ a^1$. The straight line joining $M^3\ M^4$ and forming the base of the quadrilateral $M^3\ M^4\ a^2\ a^1$, in which $M^3\ a^1$ is equal to $M^4\ a^2$ and the angle $M^3\ a^1\ a^2$ is equal to angle $M^4\ a^2\ a^1$, is parallel to $a^1\ a^2$.

Summarizing, it will be seen that in the relative movement of the central mass $d$ and of the two principal connecting rods, the straight line $M^3\ M^4$ remains sensibly parallel to $a^1\ a^2$ of the central mass.

Now in the revolution of the motor, this straight line $M^3\ M^4$ is just the axis of two opposite cylinders, and therefore moves with the casing, turning about the center of rotation $o'$ (Fig. 3) with a uniform velocity. The result is that the straight line $a^1\ a^2$ (and therefore the piece $d$) constantly parallel to $M^3\ M^4$, participates in the same uniform movement of rotation about its own center of rotation $o$ (center of crank pin).

As all points of the hub or member $d$ move in the same manner, the result is that each foot $a\ a\ a\ a\ a\ a$ of the principal or secondary connecting rods describes a circle with a continuous uniform motion.

Claims:

1. In a radial rotary cylinder motor, having an even number of radial cylinders, a crank shaft about which said cylinders are rotatably mounted, a member revolubly mounted on the crank pin of said shaft, pistons in said cylinders, a pair of principal connecting rods appertaining respectively to the pistons of opposite cylinders and connected to said revoluble member, secondary connecting rods appertaining to the pistons of others of said cylinders and connected to said revoluble member, a connecting member between said opposite principal connecting rods, for connecting the latter mechanically together, and means for pivotally connecting said opposite principal connecting rods to said connecting member.

2. In a radial rotary cylinder motor, having an even number of radial cylinders, a crank shaft about which said cylinders are rotatably mounted, a member revolubly mounted on the crank pin of said shaft, pistons in said cylinders, a pair of principal connecting rods appertaining respectively to the pistons of opposite cylinders and connected to said revoluble member, secondary connecting rods appertaining to the pistons of others of said cylinders and connected to said revoluble member, a connecting member, independent of the crank, between said opposite principal connecting rods, for connecting the latter mechanically together, and means for pivotally connecting said principal connecting rods to said connecting member.

3. In a radial rotary cylinder motor, having an even number of radial cylinders, a crank shaft about which said cylinders are rotatably mounted, pistons in said cylinders, two principal connecting rods appertaining to the pistons of opposite cylinders, secondary connecting rods appertaining to the pistons of others of said cylinders, a hub member revolubly mounted on the crank pin of the crank shaft and to which said principal and secondary connecting rods are connected, a member extending around the crank pin and independent thereof, for mechanically connecting said opposite principal connecting rods together, and means for pivotally connecting said opposite principal connecting rods to said connecting member at points located laterally of their points of connection to the hub member.

4. In a radial rotary cylinder motor, having an even number of radial cylinders, a crank shaft about which said cylinders are rotatably mounted, pistons in said cylinders, a hub member revolubly mounted on the crank pin of the crank shaft, a pair of principal connecting rods appertaining to the pistons of opposite cylinders and connected to said hub member at diametrically opposite points, secondary connecting rods appertaining to the pistons of others of said cylinders and connected to the hub member, a member independent of the crank pin, for mechanically connecting said opposite principal connecting rods together, and to which the latter are pivotally connected at diametrically opposite points located laterally of their respective points of connection to the hub member, substantially as described.

5. In a radial rotary cylinder motor having an even number of radial cylinders, a crank shaft about which said cylinders are rotatably mounted, pistons in said cylinders, a hub member revolubly mounted on the crank pin of the crank shaft, a pair of principal connecting rods appertaining to the pistons of opposite cylinders and connected to said hub member at diametrically opposite points, secondary connecting rods appertaining to the pistons of others of said cylinders and connected to the hub member, a mechanically connecting member independent of the crank pin and to which said opposite principal connecting rods are pivotally connected at points on a diameter lying in a plane at an angle to the diametrical plane of the points of connection of these principal rods to the hub member, and means for pivotally connecting said opposite principal connecting rods to said mechanically connecting member.

6. In a radial rotary cylinder motor having an even number of radial cylinders disposed in diametrically opposite pairs, a crank shaft about which said cylinders are rotatably mounted, pistons in said cylinders, a hub member revolubly mounted on the crank pin of the crank shaft, a pair of principal connecting rods appertaining to the pistons of opposite cylinders and connected to the hub member at diametrically opposite points, lateral extensions on the inner ends of said principal connecting rods, secondary connecting rods appertaining to the pistons of others of said cylinders and connected to the hub member, a mechanically connecting member independent of and extending around the crank pin and to which the lateral extensions of said opposite principal connecting rods are pivotally connected at diametrically opposite points, and means for pivotally connecting said lateral extensions to said mechanically connecting member, substantially as described.

7. In a radial rotary cylinder motor having an even number of radial cylinders, a crank shaft about which said cylinders are rotatably mounted, pistons in said cylinders, a hub member revolubly mounted on the crank pin of the crank shaft, a pair of principal connecting rods appertaining to the pistons of opposite cylinders and connected to the hub member at diametrically opposite points, the diameter passing through the axis of the crank pin, secondary connecting rods appertaining to the pistons of others of said cylinders and connected to the hub member, lateral extensions on the inner ends of said principal connecting rods, a mechanically connecting member for said principal connecting rods, independent of the crank pin and to which the lateral extensions of said principal connecting rods are pivotally connected at diametrically opposite points of a line passing through the axis of the crank pin at an angle to the line joining the points of connection of these principal rods to the hub member, and means for pivotally connecting said lateral connections to said mechanically connecting member, substantially as described.

8. In a radial rotary cylinder motor having an even number of radial cylinders disposed in diametrically opposite pairs, a crank shaft about which said cylinders are rotatably mounted, pistons in said cylinders, a hub member revolubly mounted on the crank pin of the crank shaft, a pair of forked ended principal connecting rods appertaining to the pistons of opposite cylinders and connected to the hub member at diametrically opposite points thereof, forked ended secondary connecting rods appertaining to the pistons of others of said cylinders and connected to the hub member, lateral extensions on the inner ends of said principal connecting rods, a mechanically connecting member for said principal connecting rods, independent of and extending around the hub member and embraced by the forked ends of the connecting rods, the lateral extensions of said opposite principal connecting rods being pivotally connected to said mechanically connecting member at diametrically opposite points of a line passing through the axis of the crank pin at an angle to the diametrical line joining the points of connection of these principal rods to the hub member, and means for pivotally connecting said lateral extensions to said mechanically connecting member, substantially as described.

9. In a radial rotary cylinder motor having an even number of radial cylinders disposed in diametrically opposite pairs, a crank shaft about which said cylinders are rotatably mounted, pistons in said cylinders a member revolubly mounted on the crank pin of the crank shaft, a pair of forked ended principal connecting rods appertaining to the pistons of opposite cylinders and connected to the hub member at diametrically opposite points thereof, forked ended secondary connecting rods appertaining to the pistons of others of said cylinders and connected to the hub member, lateral extensions on the inner ends of said principal connecting rods, an annular connecting member for said principal connecting rods, independent of and concentrically surrounding the hub member and embraced by the forked ends of the connecting rods, the lateral extensions of said opposite principal connecting rods being pivoted to said annular member at diametrically opposite points of a line passing through the axis of the crank pin at an angle to the diametrical line joining the points of connection of these principal rods to the hub member, and means for pivotally connecting said lateral extensions to said annular connecting member, substantially as described.

10. In a radial rotary cylinder motor having an even number of radial cylinders rotatably mounted about the crank shaft and having their connecting rods rotatably mounted on the crank pin, opposite principal connecting rods mounted about the crank pin at opposite points of a straight line passing through the crank pin center, in combination with a mechanically connecting member for said opposite principal connecting rods, these latter rods being pivotally connected to said mechanically connecting member at points so located in relation to said opposite points of mounting of said principal connecting rods that the said straight line joining these latter points rotates about the crank pin center with an angular velocity sensibly equal to that of the cylinders about the crank shaft.

11. In a radial rotary cylinder motor having an even number of radial cylinders, a crank shaft about which said cylinders are rotatably mounted, pistons in said cylinders, a hub member revolubly mounted on the crank pin of the crank shaft, a pair of principal connecting rods appertaining to the pistons of opposite cylinders and connected to said hub member at opposite points of a straight line passing through the crank pin center, secondary connecting rods appertaining to the pistons or others of said cylinders and connected to the hub member, and a mechanically connecting member independent of the crank pin and to which said opposite principal connecting rods are pivotally connected at points so located in relation to said opposite points of connection of said principal connecting rods to the hub member, that said straight line joining these latter points rotates about the center of the crank pin with an angular velocity equal to that of the cylinders about the crank shaft.

12. In a radial rotary cylinder motor having an even number of radial cylinders, a crank shaft about which said cylinders are rotatably mounted, pistons in said cylinders, a hub member revolubly mounted on the crank pin of the crank shaft, a pair of principal connecting rods appertaining to the pistons of opposite cylinders and connected to said hub member at oposite points of a straight line passing through the crank pin center, lateral extensions on the inner ends of said opposite principal connecting rods, secondary connecting rods appertaining to the pistons of others of said cylinders and connected to the hub member, and a mechanically connecting member independent of the crank pin and to which the lateral extensions of said opposite principal connecting rods are pivotally connected at opposite points of a straight line passing through the center of the crank pin, said latter points being so located in relation to the points of connection of the opposite principal connecting rods to the hub member, that the straight line joining the points of connection to the opposite principal connecting rods to the hub member rotates about the center of the crank pin with an angular velocity sensibly equal to that of the cylinders about the crank shaft.

In witness whereof I have hereunto signed my name in the presence of two subscribing witnesses.

FELIX JOSEPH CHARLEMANGE TESSE.

Witnesses:
　THOMAS LAING WHITEHEAD,
　ROBERT MILTON SPEARPOINT.

Copies of this patent may be obtained for five cents each, by addressing the "Commissioner of Patents, Washington, D. C."

It is hereby certified that the name of the assignee in Letters Patent No. 1,220,706, granted March 27, 1917, upon the application of Felix Joseph Charlemagne Tesse, of La Varenne St. Hilaire, France, for an improvement in "Rotary-Cylinder Motors," was erroneously written and printed as "George Mollison," whereas said name should have been written and printed as *George Mallison*, as shown by the records of assignments in this office; and that the said Letters Patent should be read with this correction therein that the same may conform to the record of the case in the Patent Office.

Signed and sealed this 24th day of April, A. D., 1917.

[SEAL.]

F. W. H. CLAY,
*Acting Commissioner of Patents.*

Cl. 121—64.